US009506424B2

United States Patent
Siering

(10) Patent No.: US 9,506,424 B2
(45) Date of Patent: Nov. 29, 2016

(54) APPARATUS AND METHOD FOR BLEEDING OFF COMPRESSOR AIR IN A JET ENGINE

(71) Applicant: Rolls-Royce Deutschland Ltd & Co KG, Blankenfelde-Mahlow (DE)

(72) Inventor: Jean-Marc Siering, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 121 days.

(21) Appl. No.: 14/450,402

(22) Filed: Aug. 4, 2014

(65) Prior Publication Data
US 2015/0059315 A1    Mar. 5, 2015

(30) Foreign Application Priority Data

Aug. 5, 2013   (DE) .................. 10 2013 215 371

(51) Int. Cl.
*F02C 6/08* (2006.01)
*F02K 3/075* (2006.01)
*F04D 27/02* (2006.01)
*F02C 9/18* (2006.01)

(52) U.S. Cl.
CPC ............ *F02K 3/075* (2013.01); *F02C 6/08* (2013.01); *F02C 9/18* (2013.01); *F04D 27/023* (2013.01); *F04D 27/0215* (2013.01); *F05D 2210/34* (2013.01); *F05D 2250/34* (2013.01); *F05D 2260/50* (2013.01); *F05D 2270/101* (2013.01); *F05D 2270/20* (2013.01)

(58) Field of Classification Search
CPC ........ F02C 6/08; F02C 9/18; F04D 27/0215; F04D 27/023; F02K 3/075
See application file for complete search history.

(56) References Cited

U.S. PATENT DOCUMENTS

| | | | |
|---|---|---|---|
| 5,044,153 A | 9/1991 | Mouton | |
| 5,119,625 A | 6/1992 | Gloeacki | |
| 5,845,482 A * | 12/1998 | Carscallen | ............ F01D 17/105 60/226.3 |
| 7,594,403 B2 | 9/2009 | Cadieux | |
| 2002/0148216 A1 | 10/2002 | Brault et al. | |
| 2008/0063515 A1 | 3/2008 | Bil et al. | |
| 2009/0193789 A1 * | 8/2009 | Pero | .......................... F02K 1/70 60/226.2 |

FOREIGN PATENT DOCUMENTS

WO    2008/045070    4/2008

OTHER PUBLICATIONS

European Search Report dated Dec. 11, 2014 from counterpart App No. 14179505.4.
German Search Report dated Mar. 14, 2014 from counterpart App No. 10 2013 215 371.6.

* cited by examiner

*Primary Examiner* — Gerald L Sung
*Assistant Examiner* — Scott Walthour
(74) *Attorney, Agent, or Firm* — Shuttleworth & Ingersoll, PC; Timothy Klima

(57) ABSTRACT

A device and a method for bleeding compressor air in an engine includes at least one actuator and at least one closing element linked to the actuator for closing or partially closing a bypass duct via which compressor air can be bled off. It is provided here that the closing element is designed to be successively moved into the bypass duct, with the airflow passing through the bypass duct being settable by the position of the closing element. Furthermore, an air guiding device linked to the closing element is provided and has air guiding surfaces which adjoin the closing element downstream, the spatial alignment of the air guiding surfaces being dependent on the position of the closing element.

13 Claims, 6 Drawing Sheets

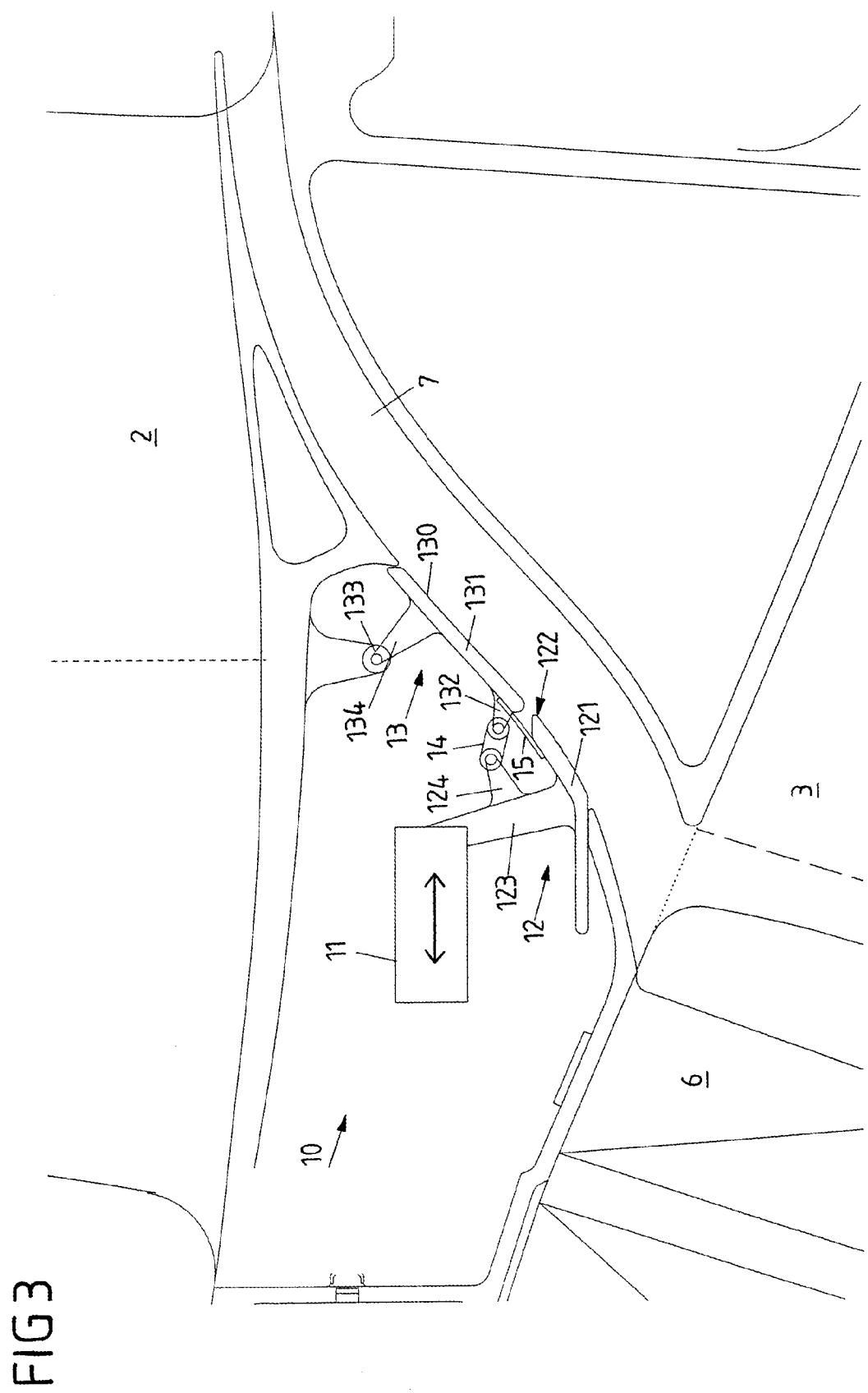

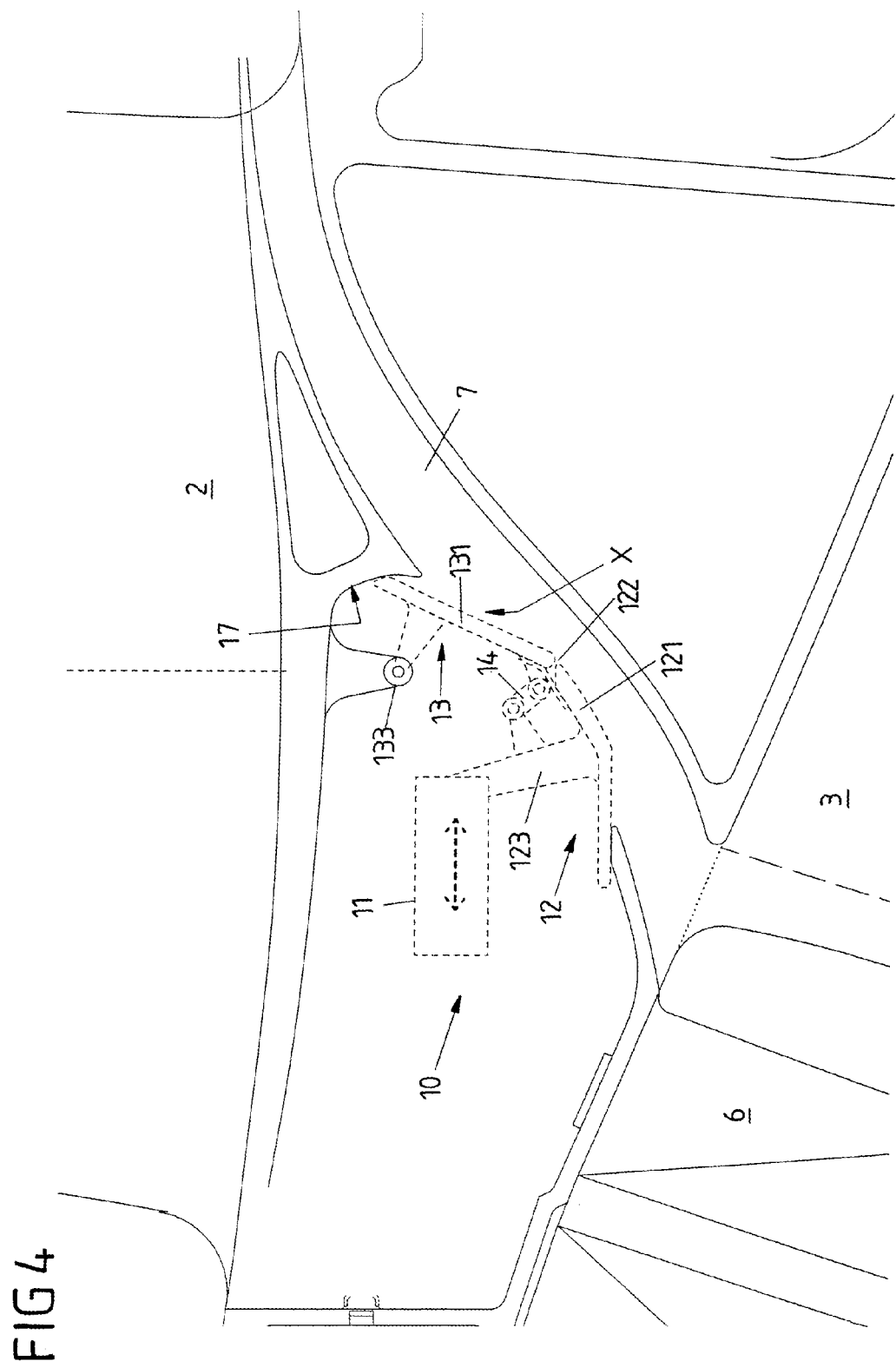

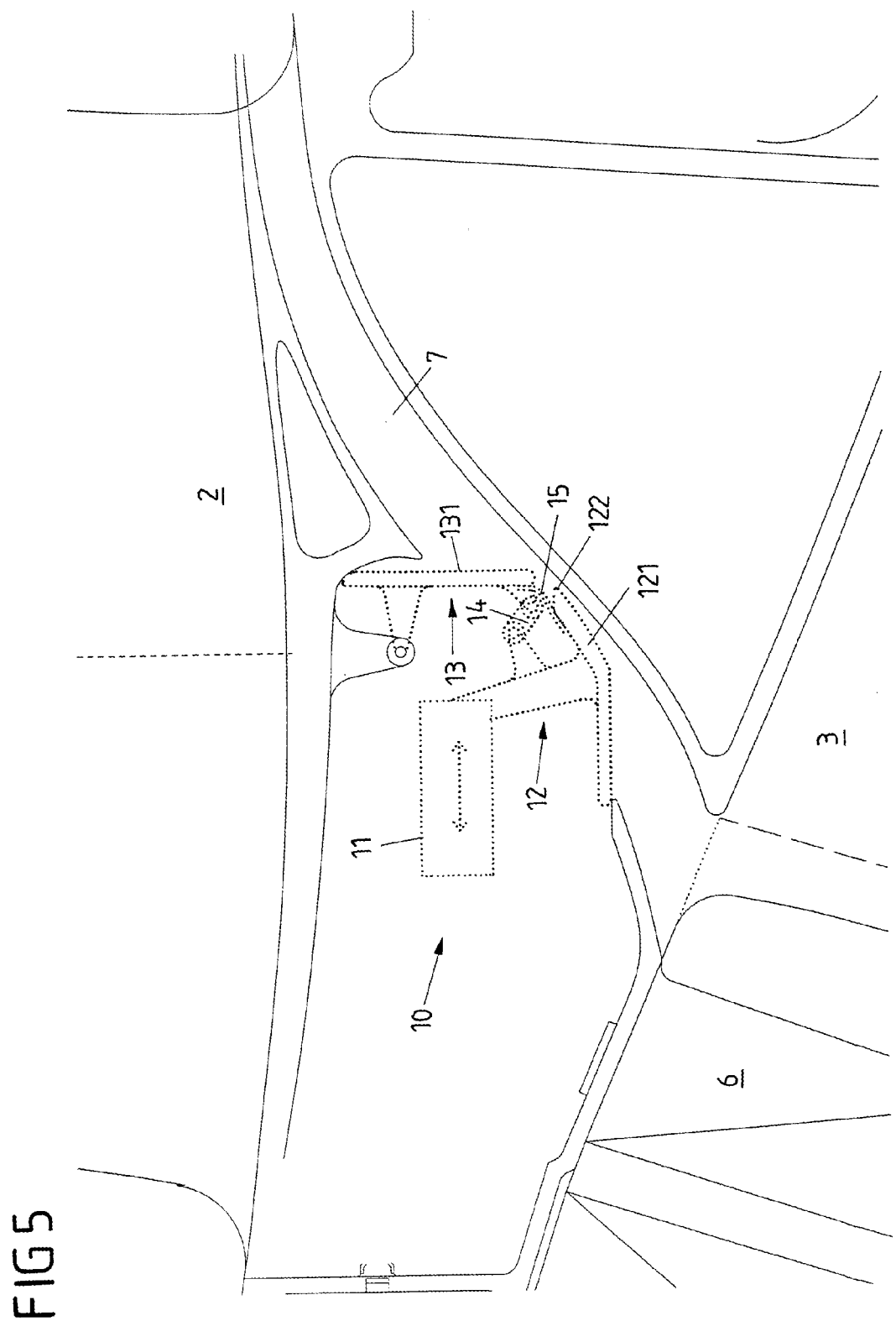

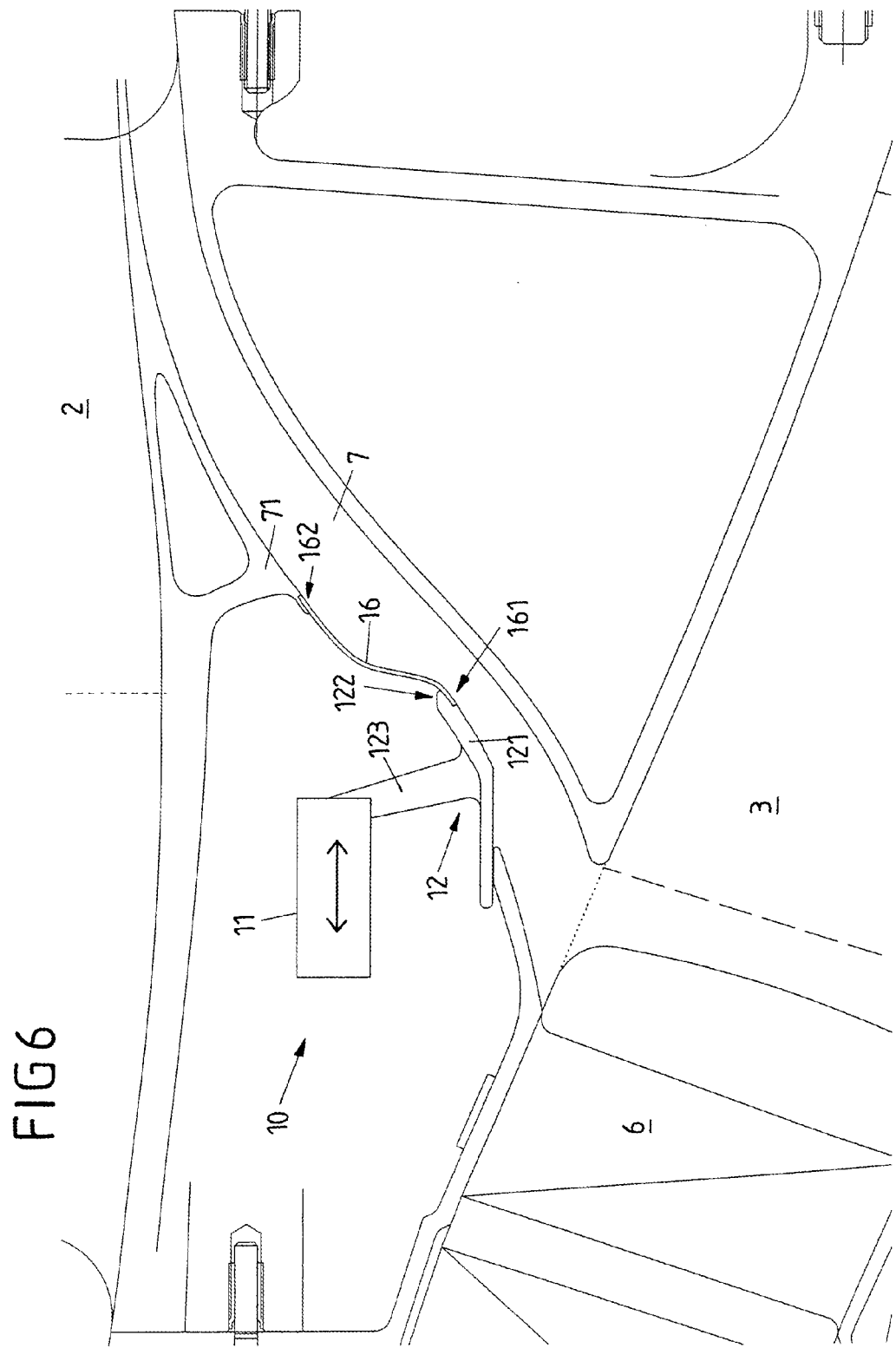

APPARATUS AND METHOD FOR BLEEDING OFF COMPRESSOR AIR IN A JET ENGINE

CROSS-REFERENCE TO RELATED APPLICATION

This application claims priority to German Patent Application No. 10 2013 215 371.6 filed on Aug. 5, 2013, the entirety of which is incorporated by reference herein.

BACKGROUND

This invention relates to a device and a method for bleeding compressor air in an engine.

It is known to extract compressor air from a compressor of an engine, in order to vary the mass flow through the compressor and to optimize the latter in respect of its aerodynamic stability. The bleeding of compressor air is used, for example, to prevent unstable operating states of a low-pressure compressor.

A device is known from U.S. Pat. No. 7,594,403 B2 for extracting compressor air from a low-pressure compressor, where in the wall of the low-pressure compressor openings are provided which can be released or closed by an adjusting ring arranged on the outside. The extracted compressor air is supplied to a secondary flow duct via bypass ducts. A device of this type for controllable bleeding of compressor air from a low-pressure compressor is also referred to as a booster bleed valve (BBV) system.

A turbofan engine is known from US 2002/0148216 A1 in which openings are provided behind a low-pressure compressor in the wall of the primary flow duct, via which openings compressor air is passed into an annular cavity. From this cavity, a plurality of ducts leads to a secondary flow duct of the engine. Each of these ducts is assigned a valve to open or close the respective duct.

In known BBV systems, only the positions "open" and "closed" are possible, for example by valve rings or valve flaps, since in the transitional positions the air is too heavily swirled. This has the disadvantage that it is not possible to make a defined setting of the airflow that is passed through the bypass duct, because with only partial release of the openings a high degree of swirling occurs in known BBV systems, leading to a loss of efficiency and an increase in noise.

SUMMARY

An object underlying the present invention is to provide a device and a method for bleeding compressor air in an engine which enable with no—or with only a small—loss of efficiency a defined setting of the airflow that is passed through a bypass duct for the compressor air to be bled.

The solution in accordance with an exemplary embodiment of the invention is characterized by a closing element which is designed to be successively moved into the bypass duct. The airflow passing through the bypass duct here is settable by the position of the closing element. Furthermore, an air guiding device linked to the closing element is provided and has air guiding surfaces which adjoin the closing element downstream, the spatial alignment of the air guiding surfaces being dependent on the position of the closing element.

The solution in accordance with the invention permits a defined setting of the airflow that is passed through the bypass duct and bled off. The airflow can be set substantially stepless here, with operating situations also being achievable in which a defined mass flow is permanently bled from the compressor in order to optimize its efficiency.

At the same time, it is ensured by the provision of an air guiding device with air guiding surfaces in the bypass duct that swirling of the gas flow behind the closing element is prevented or reduced, and instead the flow in the bypass duct has a high laminarity even behind the closing element. To that end, the air guiding surfaces adjoin downstream, for example, a front-side edge of the closing element protruding into the bypass duct.

Due to the spatial alignment of the air guiding surfaces being dependent on the position of the closing element, it can be ensured that in every position of the closing element, i.e. for every degree of opening of the bypass duct, the highest possible laminarity of the flow is obtained behind the closing element partially closing the bypass duct.

It is pointed out that the characteristic of the spatial alignment of the air guiding surfaces being dependent on the position of the closing element means that a normal vector positioned on an air guiding surface changes its orientation inside the space depending on the position of the closing element. A normal vector of this type is, in other words, changed in respect of its spatial direction depending on the position of the closing element. A change in the spatial alignment does not, for example, apply when an air guiding surface is parallelly displaced in only one spatial direction. In this case, only the starting point of the normal vector is displaced, without its direction inside the space changing.

In accordance with an exemplary embodiment of the present invention, the closing element is formed by an axially displaceable ring or an axially displaceable ring segment. The bypass duct can here be designed rotationally symmetrical. The bypass duct is successively closed by the axial displacement of the ring or of one or more ring segments.

An exemplary embodiment of the invention provides that the air guiding device is formed by a plurality of flaps. The flaps are in each case designed movable relative to the closing element, with each of the flaps forming an air guiding surface. Between the flaps there is a gap in the circumferential direction, which can be of small dimensions. The provision of a plurality of flaps ensures that they can change their spatial alignment depending on the position of the closing element. It is thus provided that the inclination angle of the flaps is dependent on the position of the closing element.

In accordance with a design variant it is provided, for linking the flaps to the closing element, that each of the flaps is connected to the closing element via at least one joint. As a result, when there is a change in the position of the closing element the spatial alignment of the flaps is automatically also changed and adapted. It is further provided in accordance with a design variant that each of the flaps is additionally connected to a stationary anchor point via a further joint. A stationary anchor point of this type can for example be provided by an intermediate casing (IMC) absorbing structural loads.

In accordance with a preferred embodiment, the spatial alignment of the air guiding surfaces undergoes a change, depending on the position of the closing element, such that for each position of the closing element the increase in laminarity of the flow provided by the air guiding surfaces is at its maximum. For example, it is initially calculated how the air guiding surfaces are to be aligned at certain positions of the closing element in order to achieve a highest possible degree of laminarity in the flow, and the link between air guiding device and closing element is then designed (e.g. by appropriately positioned joints) such that an optimum spatial alignment of the air guiding surfaces is achieved in every position of the closing element.

In accordance with an alternative exemplary embodiment, the air guiding device is formed not by a plurality of flaps, but by a flexible element of flat design. This element forms two end areas, with one end area being connected in a rim area of the closing element to the latter and the other end area being arranged downstream therefrom and stationary on a limiting structure of the bypass duct. By such an arrangement of the element and due to its flexible properties, it is ensured with this design variant too that the spatial alignment of the air guiding surfaces is dependent on the position of the closing element. The flat-designed element is formed here for example by a metal sheet, and can be designed as a ring or ring segment.

The device in accordance with the invention can be designed to achieve, among other things, an operating state in which the closing element assumes a position such that 30% to 80%, and in particular 40% to 70%, of the maximum mass flow that can bleed off through the bypass duct flow permanently through said bypass duct. By providing a continuous mass flow, the efficiency of the compressor in exemplary embodiments can be optimally set.

Displaceability of the closing element can be achieved in a number of ways. For example, the closing element (which as mentioned is designed for example as a ring or ring segment) can be linked to an actuator via an eccentric. Displaceability can however also be achieved in another way, for example using a system of shafts or using levers and joint rods.

The solution in accordance with the invention is for example used in a low-pressure compressor of a turbofan engine. Bleeding of compressor air is here typically achieved at low speeds or during transient processes. The invention can however as a general principle also be implemented in another compressor of an engine, for example for bleeding the compressor air of a high-pressure compressor in a core engine. Also, the invention is not restricted to turbofan engines; the compressor air can also be bled into the environment instead of into a secondary flow duct.

The invention also relates to a method for bleeding compressor air in an engine, where the compressor air to be discharged is guided from a compressor of the engine into a bypass duct. It is provided here that during operation of the engine air is discharged via the bypass duct by moving a displaceable closing element into the bypass duct such that the latter is only partially closed. The compressor air flowing in the bypass duct downstream of the closing element is here routed past air guiding surfaces of an air guiding device linked to the closing element in order to increase the laminarity of the flow.

BRIEF DESCRIPTION OF THE DRAWINGS

The present invention is described in the following with reference to the figures of the accompanying drawing showing several exemplary embodiments.

FIG. 3 shows the bypass duct of FIG. 2, representing a first position of the closing element.

FIG. 4 shows the bypass duct of FIG. 2, representing a second position of the closing element.

FIG. 5 shows the bypass duct of FIG. 2, representing a third position of the closing element.

FIG. 6 shows a second exemplary embodiment of a device for bleeding compressor air that closes a bypass duct in a defined manner.

DETAILED DESCRIPTION

Figure 1:
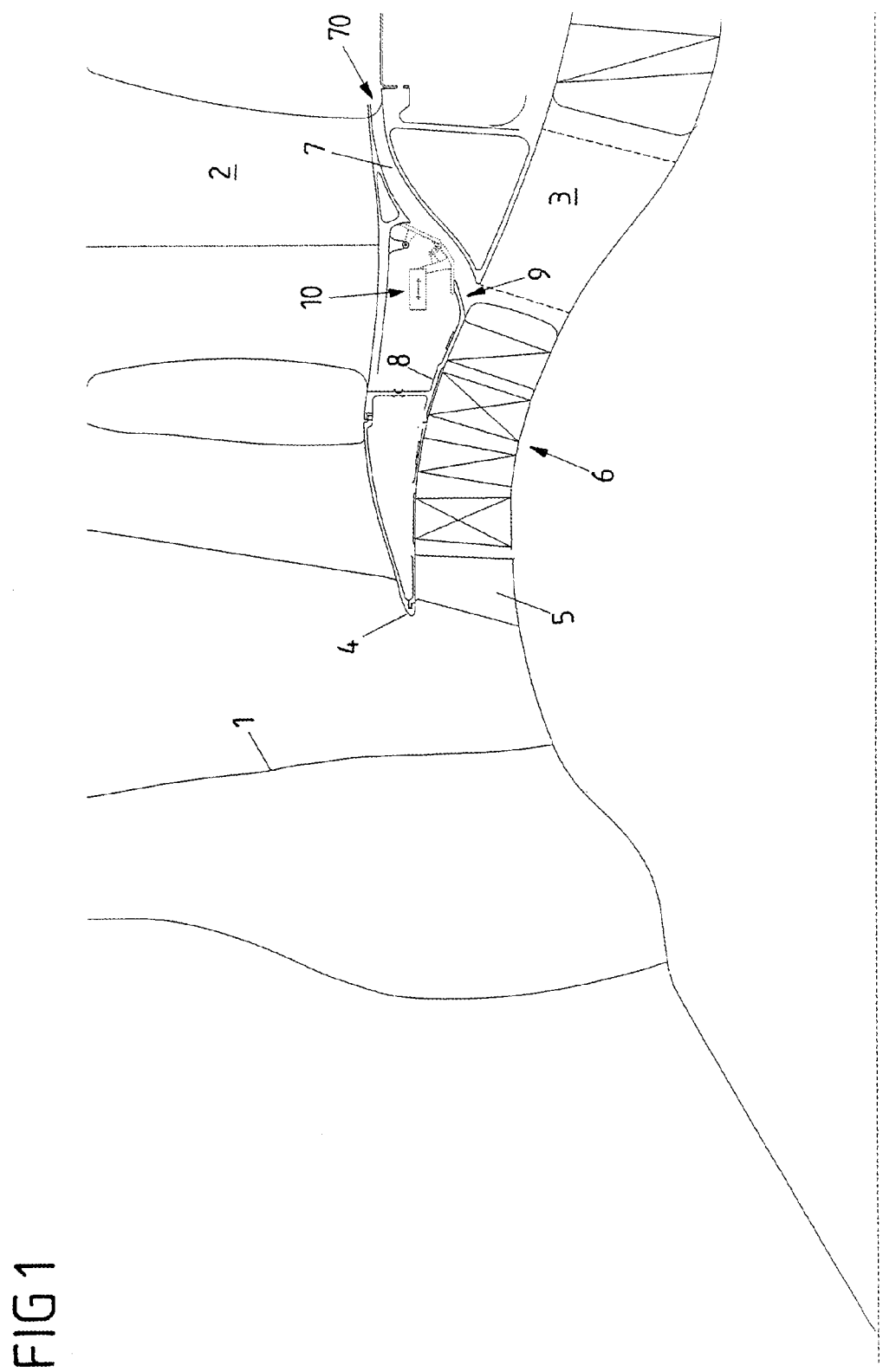
FIG. 1 shows components of an exemplary embodiment of a turbofan engine, representing a fan, a primary flow duct, a secondary flow duct, a low-pressure compressor and a flexibly closable bypass duct, through which air can be routed from the low-pressure compressor into the secondary flow duct.

FIG. 1 shows components of a turbofan engine. The section shown of a turbofan engine includes a fan stage with a fan 1, from which the air mass aspirated by the fan 1 is routed on the one hand into a secondary flow duct 2 and on the other hand into a primary flow duct 3. The secondary flow duct 2 and the primary flow duct 3 are here separated from one another behind the fan 1 by a splitter 4. The primary flow duct 3 passes through the core engine. The core engine includes, in the case of a two-shaft engine, a low-pressure compressor 6, a high-pressure compressor, a combustion chamber, a high-pressure turbine and a low-pressure turbine.

In the context of the present invention, bleeding of compressor air of the low-pressure compressor 6 is of importance. It is however pointed out that the principles of the invention, explained in the following on the basis of bleeding compressor air of a low-pressure compressor, can be used in the same way also for bleeding compressor air of a high-pressure compressor or a medium-pressure compressor (in a three-shaft engine), for example.

The low-pressure compressor 6 includes several compressor stages, two in the exemplary embodiment shown, also referred to as booster stages. Upstream of the low-pressure compressor 6, a stator wheel 5 is arranged at the start of the primary flow duct 3 to remove from the airflow the swirl previously imparted to it in the area of the fan 1 close to the hub.

The low-pressure compressor 6 is enclosed by a circumferential casing 8 delimiting the primary flow duct 3 radially outwards. Radially inwards, the primary flow duct 3 is formed by appropriate ring surfaces of the rotors and stators or by the hub or by elements of the appropriate drive shaft that are connected to the hub.

In the flow direction behind the low-pressure compressor 6, the circumferential casing 8 has an opening 9 that opens to a bypass duct 7. The bypass duct 7 is used to bleed the compressor air of the low-pressure compressor 6. The bypass duct 7 discharges the compressor air into the secondary flow duct 2 and accordingly has at its rear end 70 an opening to the secondary flow duct 2 or alternatively to structures which in turn are connected to the secondary flow duct 2. The course of the bypass duct 7 is shown in FIG. 1 only by way of example.

The opening 9 in the primary flow duct 3 to the bypass duct 7 can be designed continuous or can consist of a plurality of openings evenly spread over the circumference. The bypass duct 7 can be designed rotationally symmetrical, but can however be interrupted by structural elements, for example of an intermediate casing (IMC) absorbing structural loads.

The bypass duct 7 is assigned a device 10 that sets the bleeding of compressor air via the bypass duct 7 in a defined manner. This device 10 is explained in greater detail in the following on the basis of FIGS. 2 to 5.

Figure 2:
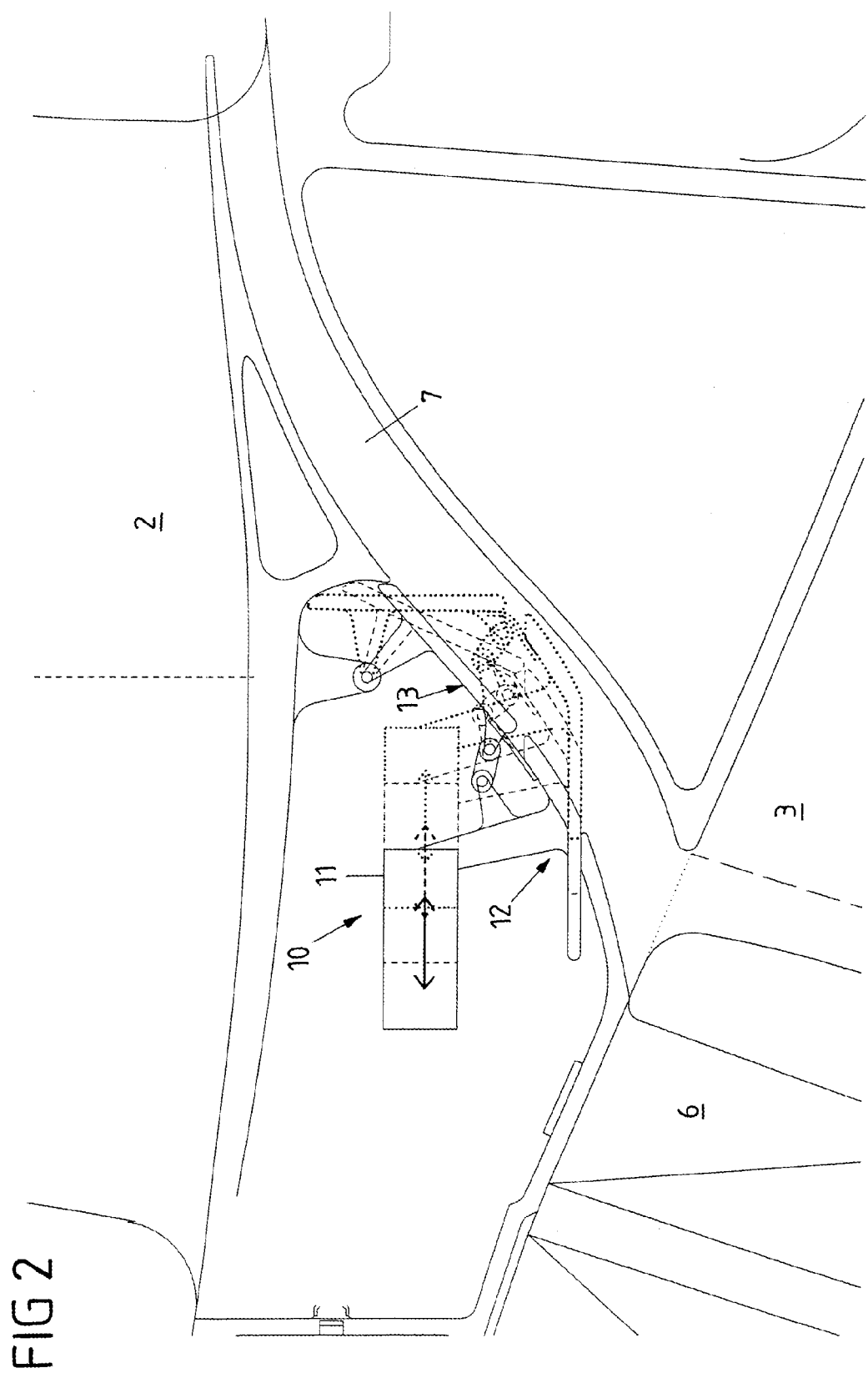
FIG. 2 shows in enlarged view the bypass duct of FIG. 1, where a device for bleeding compressor air with an axially displaceable closing element is associated with the bypass duct.

In accordance with FIG. 2, the device 10 includes an actuator 11, a closing element 12 and an air guiding device 13. The actuator 11 is displaceable in the axial direction, as shown schematically by the double arrow. The closing element 12 is linked to the actuator 10 such that it is successively displaceable into the bypass duct 7, with the airflow passing through said bypass duct 7 being settable by the position of the closing element 12. The air guiding device 13 is mechanically linked to the closing element 12 and includes air guiding surfaces which in the bypass duct 7 adjoin downstream an edge of the closing element 12 protruding into the bypass duct.

FIG. 2 shows in one representation three of the possible positions of the actuator 11, of the closing element 12 and of the air guiding device 13. FIG. 3 corresponds here to the first position, FIG. 4 to the second position and FIG. 5 to the third position. The structures of the closing element 12 and of the air guiding device 13 are described precisely using the FIGS. 3 to 5, since they are clearer due to their showing only one position each.

The closing element 12 includes a closing surface 121, which in the open position of the device, i.e. with completely opened bypass duct 7, contacts or forms the circumferential wall of the bypass duct 7. The closing surface 121 forms at its rear end (in the flow direction) an edge 122 which protrudes during axial displacement of the closing element 12 by means of the actuator 11 furthest into the bypass duct 7, cf. FIG. 4.

The closing element 12 furthermore includes a fastening arm 123 rigidly linked to the actuator 11, so that the closing surface 121 is moved in the axial direction into the bypass duct 7 by axial displacement of the actuator 11.

The axially displaceable closing surface 121 is designed as a ring or ring segment, so that during displacement of the closing surface 121 into the bypass duct 7, which is designed rotationally symmetrical, said duct is reduced in its cross-section overall or completely closed.

The air guiding device 13 includes of a plurality of flaps 130 adjacent in the circumferential direction and each forming an air guiding surface 131 to the bypass duct 7. The flaps 130 are connected on the one hand via an arm 134 to a stationary joint 133 and on the other hand via an arm 132 to a non-stationary double joint 14, which has besides the connection to the arm 132 a connection to an arm 124 projecting from the fastening arm 123. This provides a link of the air guiding device 13 to the closing element 12, in such a way that the spatial alignment of the flaps 130 and the air guiding surfaces 131 provided by the latter is dependent on the axial position of the closing element 12.

It is furthermore provided that the closing surface 121 of the closing element 12 and the air guiding surface 131 of the flaps 130 are connected to one another at their adjoining ends, i.e. in the area of the edge 122 of the closing element 12, by an element 15 on that side facing away from the bypass duct 7. This element 15 is for example a flexible metal sheet or the like. This flexible element 15 strengthens the structure of the device in the transitional area between the closing surface 121 and the air guiding surface 131, and additionally prevents air from flowing through the gap between the closing surface 121 and the air guiding surface 131.

FIG. 4 shows the device of FIG. 3 in a state in which the closing element 12 has been displaced relative to the state in FIG. 3 axially into the bypass duct 7 without closing the latter. It can be discerned here that due to the link between the air guiding device 13 and the closing element 12 via the double joint 14 the axial position of the closing element 12 defines the spatial alignment of the air guiding surfaces 131 of the air guiding device 13. The spatial alignment of the air guiding surfaces 131 changes fluidly due to this link, depending on the axial position of the closing element 12.

In structural components of the engine, a curved surface 17 is provided here allowing that end of the air guiding surface 131 facing away from the closing element 12 to perform a movement defined by the joint 133. The type and dimensions of the double joint 14 and the spatial position of the stationary joint 133 can be used here to define in the required manner the sequence of spatial orientation of the air guiding surface 131 when the closing element 12 is displaced.

It is provided here that the air guiding surface 131 has, in every axial position of the closing element 12, a spatial alignment such that the laminarity of the bleed air flowing through the bypass duct 7 behind the closing element 12, in particular behind its front-side edge 122, is high or maximum, i.e. swirling behind the closing element 12 in the bypass duct 7 is as low as possible. Any such swirling involves the disadvantage of a loss in efficiency and an increase in noise.

In this way it is achieved, by the provision of air guiding surfaces 131 in the flow direction behind the closing element 12, and in particular behind the edge 122 of the closing element 12, that the flow in the bypass duct 7 behind the edge 122 does not swirl, but is guided, in particular in the area X shown in FIG. 4, in a largely laminar manner along the air guiding surfaces 131. The air guiding surfaces 131 have the effect here, starting from the constriction of the bypass duct 7 provided by the closing element 12, of continuously widening the bypass duct until a certain width is achieved.

FIG. 5 shows the device of FIG. 3 with a position of the closing element in which the latter largely closes the bypass duct 7. The spatial alignment of the air guiding surfaces 131 is automatically adapted to the new axial position of the closing element 2. The flexible element 15 provides a secure structural connection between the closing surface 121 and the air guiding surface 131.

FIG. 6 shows an alternative exemplary embodiment of the invention. In this example, the air guiding device is formed by a flexible element 16 of flat design, provided for example by a flexible metal sheet. This flexible element 16 forms two end areas 161, 162, with one end area 161 being fastened in the area of the edge 122 of the closing element 12 and the other end area downstream therefrom and stationary to a limiting structure 71 of the bypass duct 7. The flexible element 16 forms on its side facing the bypass duct 7 air guiding surfaces which prevent or reduce swirling of the airflow behind the edge 122 of the closing element 12. At the same time, it is achieved by the flexible design of the element 16 that the spatial alignment of the air guiding surfaces provided by the element 16 is dependent on the position of the closing element 12, and accordingly an improved laminarity of the flow in the bypass duct 7 is achieved at every position of the closing element 12.

The devices described in the figures permit air to be continuously discharged via the bypass duct 7 during operation of the engine, since the closing element 12 can be positioned such that it only partially closes the bypass duct 7. Here, in order to increase the laminarity of the flow, the compressor air flowing in the bypass duct 7 behind the closing element 12 is routed past air guiding surfaces which directly adjoin downstream the closing element 12 in the bypass duct 7.

The invention in its design is not restricted to the above mentioned exemplary embodiments, which are only to be understood as examples. In particular, the structure and shaping of the closing element and of the air guiding device must be understood only as examples.

What is claimed is:

1. A device for bleeding compressor air from a compressor of an engine, comprising:
   at least one actuator,
   at least one closing element linked to the at least one actuator for closing or partially closing a bleed duct via which compressor air is bled off, wherein the at least one closing element is progressively movable into the bleed duct, using the at least one actuator such that a flow of bled compressor air passing through the bleed duct is settable by a position of the at least one closing element in the bleed duct, and
   an air guiding device linked to the at least one closing element, the air guiding device positioned along a length of the bleed duct and including air guiding surfaces which adjoin a downstream end of the at least one closing element, with an orientation of the air guiding device with respect to the at least one closing element being dependent on the position of the at least one closing element in the bleed duct; the air guiding device being connected at a first connection to the at least one closing element to be movable into the bleed duct with the at least one closing element, and, downstream of the first connection, the air guiding device being connected at a second connection with a casing of the engine;
   wherein the air guiding device includes a plurality of flaps, and the first connection includes each of the plurality of flaps being connected to the at least one closing element by a respective pivot joint to be movable relative to the at least one closing element, the plurality of flaps forming at least a portion of the air guiding surfaces;
   wherein an inclination angle of each flap is dependent on the position of the at least one closing element;
   wherein the second connection includes each of the plurality of flaps being connected to the casing by a respective further pivot joint;
   wherein each respective pivot joint is positioned on a side of the at least one closing element facing away from the bleed duct and each respective further pivot joint is positioned on a side of the plurality of flaps facing away from the bleed duct.

2. The device in accordance with claim 1, wherein the air guiding surfaces, when moved into the bleed duct, provide a laminar airflow downstream of the at least one closing element.

3. The device in accordance with claim 1, wherein the at least one closing element is formed by an axially displaceable ring or an axially displaceable ring segment.

4. The device in accordance with claim 1, and further comprising a flexible element connecting each flap to a closing surface of the at least one closing element in an area of the first connection.

5. The device in accordance with claim 1, wherein an orientation of the air guiding surfaces with respect to the at least one closing element undergoes a change, depending on the position of the at least one closing element, such that for a plurality of positions of the at least one closing element, a laminar airflow is provided downstream of the at least one closing element.

6. The device in accordance with claim 1, wherein the air guiding surfaces of the air guiding device are spatially aligned such that the width of a portion of the bleed duct defined in part by the air guiding device continuously increases up to a defined width.

7. The device in accordance with claim 1, wherein the at least one closing element assumes a position such that 30% to 80% of a maximum mass flow of bled compressor air is bled off through the bleed duct.

8. The device in accordance with claim 1, and further comprising an eccentric element connecting the at least one actuator to the at least one closing element.

9. The device in accordance with claim 1, wherein the engine is a turbofan engine and the compressor is a low-pressure compressor of the turbofan engine.

10. A turbofan engine including the device in accordance with claim 1.

11. An engine including the device in accordance with claim 1.

12. The device in accordance with claim 1, wherein the at least one closing element assumes a position such that 40% to 70% of a maximum mass flow of bled compressor air is bled off through the bleed duct.

13. The device in accordance with claim 1, wherein the at least one closing element is positioned intermediate along the length of the bleed duct, and wherein the respective pivot joint connects the downstream end of the at least one closing element with an upstream portion of the air guiding device such that in a closed or partially closed position, the bleed duct converges in a downstream direction toward the first connection and diverges in the downstream direction away from the first connection.

* * * * *